(12) United States Patent
Piringer et al.

(10) Patent No.: US 9,919,965 B2
(45) Date of Patent: Mar. 20, 2018

(54) METHOD FOR BURNING LUMP MATERIAL

(71) Applicant: MAERZ OFENBAU AG, Zürich (CH)

(72) Inventors: Hannes Piringer, Beinwill am See (CH); Patrick Bucher, Dottikon (CH)

(73) Assignee: Maerz Ofenbau AG, Zurich (CH)

( * ) Notice: Subject to any disclaimer, the term of this patent is extended or adjusted under 35 U.S.C. 154(b) by 341 days.

(21) Appl. No.: 14/652,007

(22) PCT Filed: Sep. 9, 2013

(86) PCT No.: PCT/EP2013/068623
§ 371 (c)(1),
(2) Date: Jun. 12, 2015

(87) PCT Pub. No.: WO2014/090427
PCT Pub. Date: Jun. 19, 2014

(65) Prior Publication Data
US 2015/0353421 A1   Dec. 10, 2015

(30) Foreign Application Priority Data
Dec. 12, 2012   (DE) .................. 10 2012 112 168

(51) Int. Cl.
*C04B 2/12* (2006.01)
*F27B 1/02* (2006.01)
(Continued)

(52) U.S. Cl.
CPC .................. *C04B 2/12* (2013.01); *F23B 7/00* (2013.01); *F23B 40/00* (2013.01); *F23L 7/002* (2013.01); *F27B 1/02* (2013.01); *F27B 1/24* (2013.01)

(58) Field of Classification Search
CPC .. C04B 2/10; C04B 2/12; C21B 13/10; C21C 5/5217; F27B 1/02; F27B 1/10
See application file for complete search history.

(56) References Cited

U.S. PATENT DOCUMENTS 4,289,482 A * 9/1981 Fussl .................. F27B 1/02
                                            432/14
4,810,190 A * 3/1989 Fussl .................. C04B 2/12
                                            110/101 CC
(Continued)

FOREIGN PATENT DOCUMENTS

| CN | 101269919 A | 9/2008 |
| DE | 3227395 C2 | 5/1991 |
| DE | 102011051675 B3 | 10/2012 |

OTHER PUBLICATIONS

Application No. PCT/EP2013/068623, International Search Report dated Feb. 13, 2014, 2 pages.

*Primary Examiner* — Gregory A Wilson
(74) *Attorney, Agent, or Firm* — Lathrop Gage L.L.P.

(57) ABSTRACT

A method for burning lumpy stock is performed in at least one shaft which comprises a preheating zone, a burning zone and a cooling zone. Coal with a swelling index >1 is supplied together with a transport medium via burner lances which have burner tips. The coal together with the transport medium emerges into the shaft, wherein the temperature of the coal in the burner lances is kept below a temperature value at which melt phases of the coal that is used are formed. Here, for the transportation of the coal, use is made of a transport medium which, in the shaft, in the region directly adjacent to the burner tip, forms an oxygen-depleted atmosphere in order to delay the ignition of the coal after it emerges from the burner lance.

13 Claims, 4 Drawing Sheets

(51) Int. Cl.
   *F27B 1/24*   (2006.01)
   *F23B 30/00*  (2006.01)
   *F23B 40/00*  (2006.01)
   *F23L 7/00*   (2006.01)

(56) References Cited

U.S. PATENT DOCUMENTS

| | | | | |
|---|---|---|---|---|
| 5,460,517 A | * | 10/1995 | Scheibenreif | C04B 2/12 |
| | | | | 432/95 |
| 6,113,387 A | * | 9/2000 | Wilson | F27B 1/005 |
| | | | | 432/95 |
| 8,673,247 B2 | * | 3/2014 | Thibeaumont | C04B 2/02 |
| | | | | 423/155 |

* cited by examiner

METHOD FOR BURNING LUMP MATERIAL

CROSS-REFERENCE TO RELATED APPLICATIONS

This application is the national phase of, and claims priority to, International Patent Application No. PCT/EP2013/068623, filed Sep. 9, 2013, which designated the U.S. and which claims priority to German Application No. DE 102012112168.0, filed Dec. 12, 2012. These applications are each incorporated by reference herein in their entireties.

BACKGROUND

1. Field of the Invention

The invention relates to a method for burning lumpy stock, in particular limestone, dolomite brick, magnesate brick or other carbonate rock, in at least one shaft which comprises a preheating zone, a burning zone and a cooling zone, wherein coal is supplied via burner lances.

2. Description of the Related Art

The fuel costs for lime burning are considerable and may account for more than 50% of the production costs. Since coal is in most cases the cheapest energy source, most lime kilns are nowadays coal-fired. Coal can however vary greatly in terms of its properties. For example, a high content of ash and sulfur has an adverse effect, as the burnt lime is undesirably contaminated.

A particular characteristic of coal is its swelling index. From numerous practical tests, it is known that it has hitherto not been possible for coal with a swelling index of greater than 1.0 to be used in lime kilns, in particular in parallel flow-counter flow regenerative lime kilns, as severe operational problems were encountered, such as for example blockage of the burner lances and burn-up of the burner lances owing to oxidation or melting. Owing to the restricted usability of such coals in PCR shaft-type lime kilns, it has hitherto been the case that either a cylindrical rotary kiln has been used, or petroleum coke or liquid or gaseous fuels have had to be used. Cylindrical rotary kilns however have the considerable disadvantage that they consume 50-100% more fuel than PCR lime kilns, and consequently also discharge a much greater amount of $CO_2$ into the atmosphere. The use of petroleum coke is also disadvantageous, as its sulfur content can be up to 10 times that of coal, giving rise to further limitations. Furthermore, liquid and gaseous fuels are under some circumstances not available, or are much more expensive than coal.

DE 32 27 395 C2 discloses a method for producing briquettes for the fixed bed of a gasifier reactor or shaft-type kiln, wherein 30-85% non-caking raw coal and 15-70% caking raw coal are mixed and subsequently formed into briquettes, wherein the caking coal has a caking capacity (swelling index) of $\geq 5$.

SUMMARY OF THE INVENTION

The invention is based on the object of specifying a method for burning lumpy stock, by means of which method the fuel costs can be reduced.

DETAILED DESCRIPTION

Figure 1:
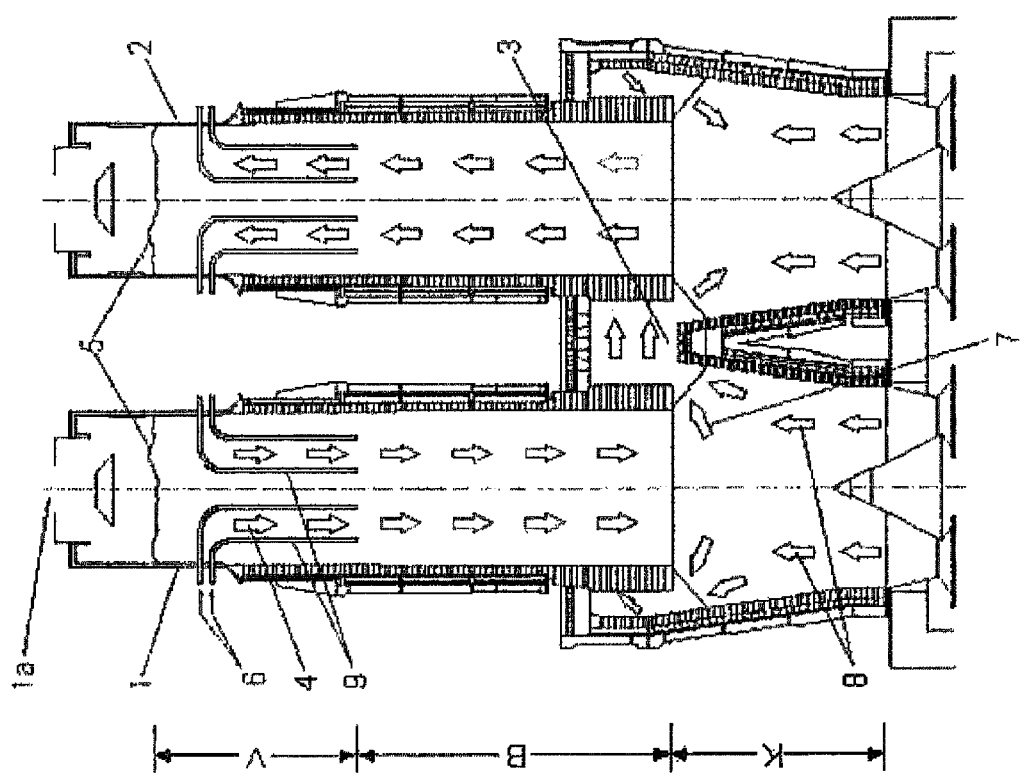
FIG. 1 is a cross-sectional illustration of a parallel flow-counter flow regenerative lime kiln according to one embodiment of the invention.

According to the invention, the method for burning lumpy stock is performed in at least one shaft which comprises a preheating zone, a burning zone and a cooling zone. Coal with a swelling index >1 is supplied together with a transport medium via burner lances which have burner tips via which the coal together with the transport medium emerges into the shaft. The temperature of the coal in the burner lances is kept below a temperature value at which melt phases of the coal that is used are formed. Here, for the transportation of the coal, use is made of a transport medium which, in the shaft, in the region directly adjacent to the burner tip, forms an oxygen-depleted atmosphere in order to delay the ignition of the coal after it emerges from the burner lance.

In this application, the swelling index is to be understood in accordance with the definition in the standard ASTM D720-91.

The coal is normally injected pneumatically into the kiln in the form of coal dust via burner lances. The burner lances are situated in the preheating zone or burning zone of the shaft and are surrounded by lumpy stock, in particular limestone. Here, the temperature of the lumpy stock at the upper end of the preheating zone is approximately 100° C., whereas at the lower end, said temperature is approximately 50° C. below the calcination temperature typical for the stock for calcination, which for limestone is typically approximately 750° C. to 800° C. The heat of the lumpy stock is transmitted through the walls of the burner lances from the outside to the inside, whereby the supplied coal is heated before exiting the burner lances and automatically igniting outside said burner lances.

In the tests on which the invention is based, it was found that, above a particular temperature, coal with a swelling index >1 forms melt phases which adhere to the inner walls of the burner lances and block said burner lances after a short time. Furthermore, during the regenerative phase of a kiln shaft, said deposits within the burner lances can ignite and thus very rapidly destroy the burner lances. It has been found that specifically the volatile constituents of the coal with a swelling index >1 lead very rapidly to caking in the event of a particular temperature being exceeded. In the case of this phenomenon, it is firstly the case that a melt phase forms, which swells owing to the outgassing of the volatile constituents and rapidly blocks the burner lances. It was found that the volatile constituents of the coal escape slowly in the range from 200-300° C. and escape rapidly above 450° C. These values may however vary greatly depending on the type of coal.

In the tests on which the invention is based, using different coals, it was found that the phase transformation phenomena normally commence above 150° C. Swelling experiments in laboratory kilns furthermore showed that the swelling of the coal can commence at different temperatures depending on the type of coal. Said temperature is typically approximately 250° C. However, if the temperature of the coal in the burner lances is kept below the temperature value at which the melt phases of the coal that is used are formed, it is possible to easily use coal with a swelling index >1. In North America in particular, there is high availability of inexpensive coal which has a relatively high swelling index >1. With the method described above, it is now possible for such inexpensive coals to be used in a shaft-type lime kiln, whereby the fuel costs can be considerably reduced in relation to previously used coals.

Aside from the results discussed immediately above, the various tests likewise showed that, although the temperature of the coal in the burner tube is lowered by means of the corresponding provisions, the coal with a swelling index >1 is distributed less effectively in the stock for burning than coal with a swelling index <1, and ignites immediately after emerging from the burner lance, leading to very intense heat generation in the region of the burner tip. This resulted in burn-up from the burner tip upwards. To prevent this, in various tests, the atmosphere in the kiln in the region of the burner tip was varied by using different transport media for the coal. The ignition behavior of the coal after emerging from the burner lance was thus once again delayed. For this purpose, an oxygen-depleted atmosphere was generated around the burner tip by injection of water.

Furthermore, tests were carried out using nitrogen as transport medium for the coal, the results of which tests were surprisingly good, because the nitrogen not only lowered the temperature in the burner tube and thus prevented caking in the tube but also created an oxygen-depleted atmosphere in the region of the burner tip in the kiln. It was thus possible to once more delay the immediate ignition of the coal after emerging from the burner lance, which counteracted the generation of heat in the region of the burner tip. This resulted in a lengthening of the operating duration of the burner lances and thus an increase in kiln capacity and a reduction in downtime of the kiln.

The burner lances are preferably arranged in the preheating zone or in the burning zone of the shaft and are in operative contact with the lumpy stock situated there for the purposes of heating the coal. Here, the temperature of the coal in the burner lances is expediently kept below 250° C., preferably below 200° C. and most preferably below 150° C.

To adhere to these temperature values, it is possible for one or more of the following measures to be implemented:

- The burner lances are equipped with insulation in order to thereby greatly reduce the heat flow from the outside to the inside through the wall of the burner lances, whereby the coal is heated to a correspondingly lesser extent. This measure has the advantage that the thermal efficiency of the lime kiln is not impaired;
- The burner lances are cooled, wherein the cooling may be realized for example by way of a gas or a liquid. For example, it would be possible for the burner lances to be equipped with a casing which is cooled using water, thermal oil or air. This method, too, has only an insignificant influence on the thermal efficiency of the lime kiln;
- The coal is cooled before being supplied to the burner lances, or the coal is supplied together with a transport medium via the burner lances, wherein the temperature of the coal is set by way of the flow rate and/or temperature of the transport medium. By means of these measures, the coal is heated to a correspondingly lower temperature within the burner lances. If the transport medium is air, the increase in the flow rate of transport air can however be implemented only to a very limited extent, as the thermal efficiency of a PCR lime kiln correspondingly deteriorates with increasing air flow rate, and furthermore, the exhaust-gas temperature of the kiln correspondingly increases;
- Non-combustible components, in particular components containing CaO or $CaCO_3$, are introduced together with the coal into the burner lances in order to set the temperature of the coal. For this purpose, it would for example be possible to admix the dust from kiln exhaust gas filters in order to increase the mass flow. Such filter dust does not constitute foreign material, such that contamination of the product also does not occur;
- A liquid, in particular water, is introduced via the burner lances. Through the evaporation of the water, the increase in temperature of the coal can be correspondingly limited;
- An inert or oxygen-depleted gas, in particular nitrogen, carbon dioxide or kiln exhaust gas, is supplied via the burner lance as transport medium for the coal. The gas serves for cooling the coal and serves to realize an oxygen-depleted atmosphere in the region of the burner tip;
- Relatively short burner lances are used, or a radial arrangement is provided. These measures result in smaller surface areas of the burner lances, whereby the coal is heated to a correspondingly lesser extent;
- Simultaneous firing of coal and gas is provided. In this case, the coal and the gas are supplied simultaneously via the burner lances. The lower the calorific value of the gas, the greater the mass flow thereof which cools the coal.

Figure 2:
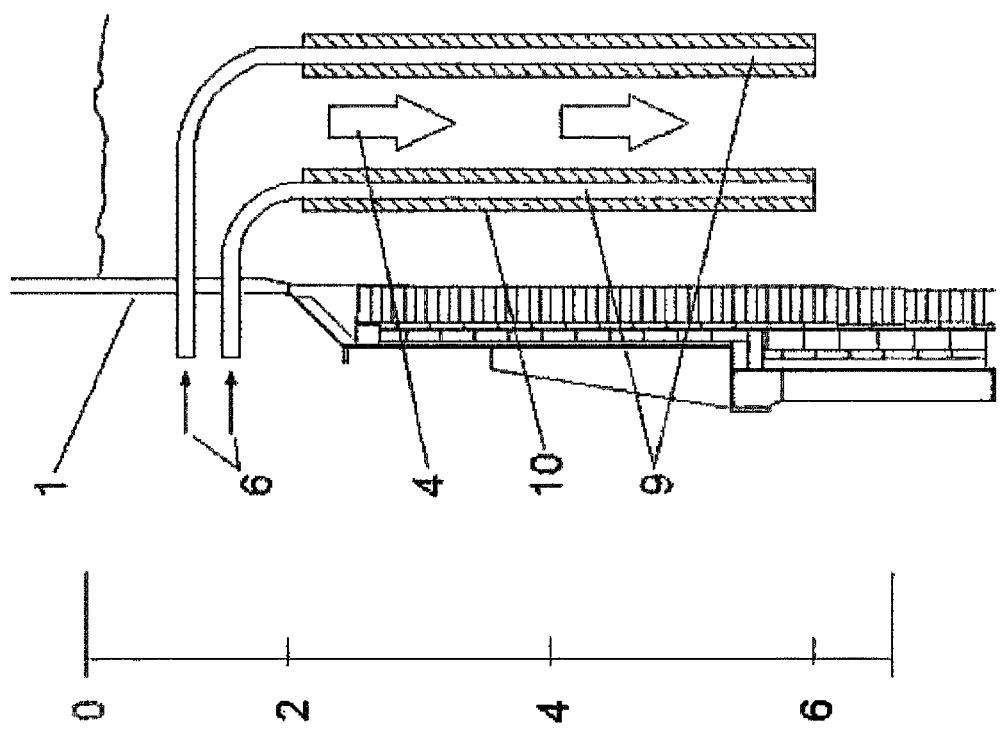
FIG. 2 is an enlarged detail illustration in the region of the burner lances according to the embodiment of FIG. 1.

Further refinements of the invention will be described in more detail below on the basis of a specific exemplary embodiment. FIGS. 1 and 2 illustrate a parallel flow-counter flow regenerative lime kiln which has two shafts 1, 2, each with a preheating zone V, a burning zone B and a cooling zone K, and which has a flow transfer duct 3 which connects the two shafts. The two shafts are, in a known manner, operated alternately as burning shaft and exhaust gas shaft, wherein the burning shaft has combustion air 4 supplied to it in a parallel flow with lumpy stock 5 for burning and coal 6. The lumpy stock is in this case limestone. The hot exhaust gases 7 that are generated in the process are conducted, together with the heated cooling air 8 supplied from below, via the flow transfer duct 3 into the exhaust gas shaft, where the exhaust gases are conducted upward in a counter flow with respect to the limestone and, in the process, preheat the limestone. After a predefined period of time of 15 minutes, for example, the function of the two shafts is interchanged, that is to say the combustion shaft becomes the exhaust gas shaft and vice versa. This method permits highly efficient burning of the limestone in a counter flow with respect to the combustion gases, and regenerative preheating of the limestone in a counter flow with respect to the hot exhaust gases.

The coal 6, which has a swelling index >1, in particular even >2, is supplied via burner lances 9.

In the exemplary embodiment illustrated, the burner lances 9 are, in the region of the preheating zone V, arranged substantially in the direction of the shaft longitudinal axis 1a and surrounded by the limestone. The fuel is supplied via the burner lances in the form of coal powder with the aid of a transport medium, and is heated owing to the heat that is transmitted inward through the wall of the burner lances from the limestone, such that the coal 6, after emerging from the burner lance 9, automatically ignites with the combustion air 4 introduced into the shaft from above. To now prevent blockage in the burner lances 9, such as is to be expected with the use of coal with a swelling index >1, it is necessary to implement suitable measures in order that the coal in the burner lances is kept below a temperature value at which melt phases of the coal that is used are formed. Depending on the coal that is used, this temperature value is for example 250° C. By adjustment to a temperature value of 200° C. or even 150° C., it is possible to prevent caking in the case of all hitherto known types of coal.

A particularly expedient measure for reducing the heating of the coal in the burner lances 9 is the provision of insulation 10 for the burner lance. Alternatively or in addition, use may also be made of one or more of the further measures already mentioned above.

Figure 3:
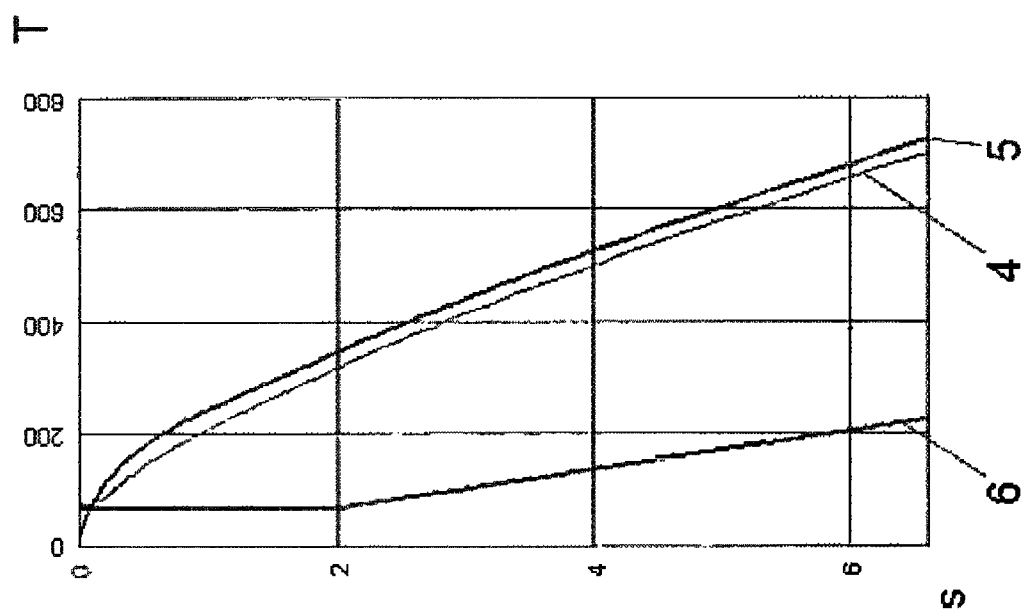
FIG. 3 is a diagram showing the profile of the temperature along the kiln axis.

The diagram of FIG. 3 illustrates the profile of the temperature of the supplied coal 6, of the combustion air 4 and of the lumpy stock (limestone) 5 along the kiln axis 1*a*. Here, the diagram depicts the region of the preheating zone from the surface of the limestone for burning to the lower end of the burner lances 9.

In this exemplary embodiment, the temperature of the coal reaches approximately 200° C. at the outlet of the burner lances 9. The limestone and the combustion air 4 are heated to approximately 700° C. in this region.

Figure 4:
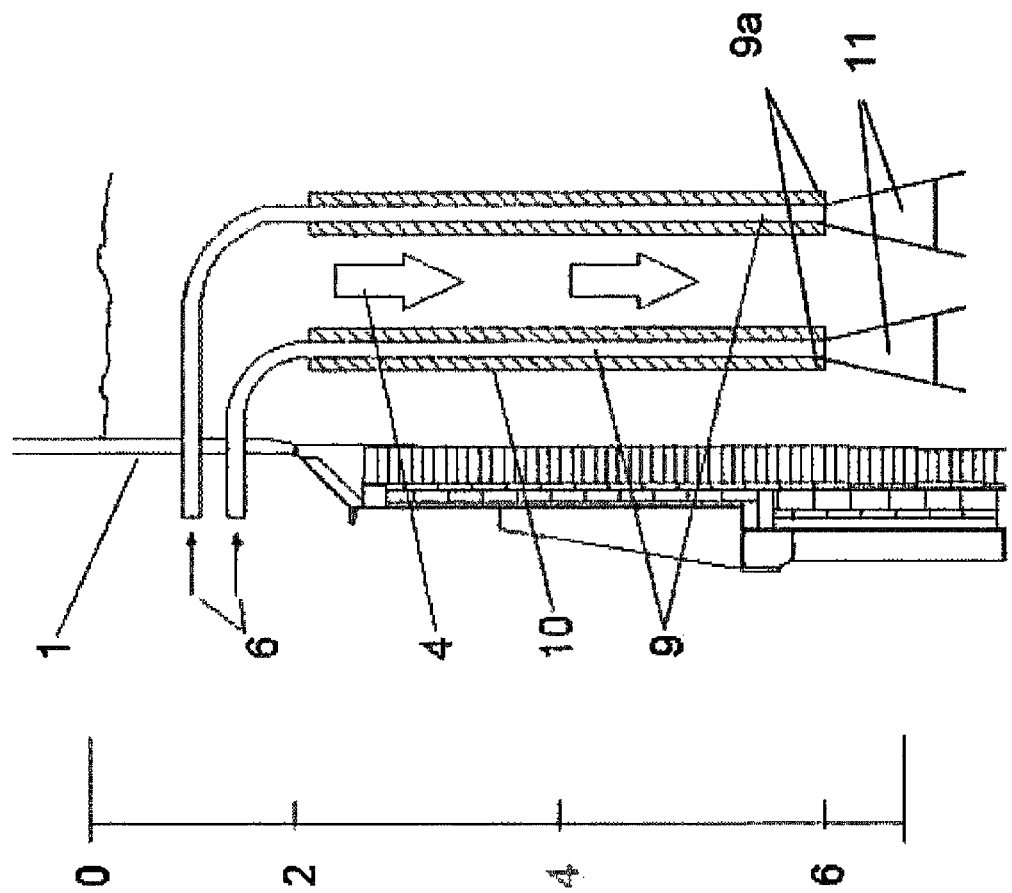
FIG. 4 is an illustration of the burner lances in the kiln, with the region of the oxygen-depleted atmosphere being indicated.

FIG. 4 shows a subregion of a shaft 1 with two burner lances 9. Coal 6 is supplied together with a transport medium, in particular nitrogen, to the shaft or to the kiln. The transport medium for the coal 6 ensures that the melting point of the coal is not exceeded in the burner lance 9, and that an oxygen-depleted atmosphere is generated in the shaft in the region directly adjacent to the burner tip 9*a*.

The described embodiment of the invention may self-evidently also be modified in a variety of aspects, without departing from the basic concept.

The invention claimed is:

1. A method for burning lumpy stock in at least one shaft, the shaft comprising:
    a preheating zone;
    a burning zone; and
    a cooling zone;
    wherein:
        a burner lance which has a burner tip supplies coal with a swelling index >1 together with a transport medium into the shaft;
        the temperature of the coal in the burner lance is kept below a temperature value at which melt phases of the coal that is used are formed; and
        the transport medium forms an oxygen-depleted atmosphere in the shaft in a region directly adjacent to the burner tip in order to delay the ignition of the coal after it emerges from the burner lance; and
        an inert gas is used as the transport medium for the coal and serves to cool the coal and to realize the oxygen-depleted atmosphere in the region of the burner tip.

2. The method of claim 1, wherein the burner lance is arranged in the preheating zone or in the burning zone of the shaft and are in operative contact with the lumpy stock situated therein for the purpose of heating the coal in the burner lances.

3. The method of claim 1, wherein the temperature of the coal in the burner lance is kept below 250° C.

4. The method of claim 1, wherein the temperature of the coal in the burner lance is kept below 200° C.

5. The method of claim 1, wherein the temperature of the coal in the burner lance is kept below 150° C.

6. The method of claim 1, wherein the burner lance is equipped with insulation.

7. The method of claim 1, wherein the burner lance is cooled.

8. The method of claim 1, wherein the coal is cooled before being supplied to the burner lance.

9. The method of claim 1, wherein the temperature of the coal is set by way of the flow rate of the transport medium.

10. The method of claim 1, wherein the temperature of the coal is set by way of the temperature of the transport medium.

11. The method of claim 1, wherein the temperature of the coal is set by way of the flow rate and temperature of the transport medium.

12. The method of claim 1, wherein the transport medium is a liquid is introduced into the burner lance in order to set the temperature of the coal.

13. The method of claim 1, wherein burning the lumpy stock is performed in a parallel flow-counter flow regenerative lime kiln having at least two shafts, each shaft having a preheating zone, a burning zone, and a cooling zone, the lime kiln further having a flow transfer duct connecting the two shafts, wherein the two shafts are operated alternately as a burning shaft and as an exhaust gas shaft.

* * * * *